United States Patent [19]

Yokota

[11] Patent Number: 5,369,456
[45] Date of Patent: Nov. 29, 1994

[54] MIRROR ADJUSTING APPARATUS OF VIEW FINDER

[75] Inventor: Hidetaka Yokota, Tokyo, Japan

[73] Assignee: Asahi Kogaku Kogyo Kabushiki Kaisha, Tokyo, Japan

[21] Appl. No.: 80,110

[22] Filed: Jun. 23, 1993

[30] Foreign Application Priority Data

Jun. 30, 1992 [JP] Japan ................. 4-172345

[51] Int. Cl.⁵ ..................... G03B 13/10; G03B 13/08
[52] U.S. Cl. ...................... 354/222; 354/224
[58] Field of Search ............... 354/222, 219, 221, 224

[56] References Cited

U.S. PATENT DOCUMENTS

| | | | |
|---|---|---|---|
| 2,161,777 | 6/1939 | Sarnes | 359/872 |
| 2,423,967 | 7/1947 | Dalotel | 354/221 |
| 3,062,086 | 11/1962 | Papke | 354/221 |
| 3,367,616 | 2/1968 | Bausch et al. | 359/872 |
| 3,719,132 | 3/1973 | Urano . | |
| 3,774,994 | 11/1973 | Urano . | |
| 4,131,354 | 12/1978 | Hagiwara . | |
| 4,624,539 | 11/1986 | King et al. | 359/872 |
| 5,095,326 | 3/1992 | Nozaki et al. . | |
| 5,157,430 | 10/1992 | Ogawa . | |
| 5,191,477 | 3/1993 | Abe et al. . | |
| 5,216,457 | 6/1993 | Yamaguchi et al. | 354/221 |
| 5,218,396 | 6/1993 | Morisawa . | |

Primary Examiner—Monroe H. Hayes
Attorney, Agent, or Firm—Sandler, Greenblum & Bernstein

[57] ABSTRACT

An adjusting apparatus of a mirror having a reflecting surface located in an optical path of a view finder. The apparatus includes a casing to which the mirror is attached, a mirror adjusting mechanism which is movable between a fixed state and an adjustable state in which the mirror is rotatable about an adjusting axis passing through the reflecting surface of the mirror. The fixed state corresponds to a design position of the mirror with respect to the casing. The mirror adjusting mechanism is brought to the fixed state upon attaching the mirror to the casing without effecting an adjustment of the mirror adjusting mechanism. The design position is within a range of angular adjustment corresponding to the adjustable state of the mirror adjusting mechanism.

14 Claims, 5 Drawing Sheets

MIRROR ADJUSTING APPARATUS OF VIEW FINDER

BACKGROUND OF THE INVENTION

1. Field of the Invention

The present invention relates to an adjusting apparatus of a mirror located in the optical path of a view finder.

2. Description of Related Art

A real image type of view finder in which an object image formed by an objective optical system is viewed through an ocular optical system, can provide a high variable power ratio. Accordingly, this type of view finder has been used with recent zoom compact cameras having a high variable power ratio. In the real image type of view finder, it is necessary that the field of view be adjusted to coincide with the picture plane of a film. To this end, a movable member, such as a mirror, is adjusted while looking through the view finder and is fixed at the appropriate position after the adjustment is complete.

Adjustment and fixing of the mirror must be carried out for each of the products (i.e., view finders) in a manufacturing line, which is troublesome.

It is therefore an object of the present invention to eliminate the above-mentioned drawback of the prior art by providing a simple adjusting apparatus of a view finder which can reduce the need for adjustment of the mirrors, and in cases where adjustment becomes necessary, allows for easy adjustment of the mirror.

SUMMARY OF THE INVENTION

To achieve the object of the present invention, an adjusting apparatus of a mirror having a reflecting surface located within an optical path of a view finder (i.e., a visual field adjuster) is provided. The apparatus includes a casing, to which the mirror is attached, and a mirror adjusting mechanism which is movable between a fixed state and an adjustable state, in which the mirror is rotatable about an adjusting axis passing through the reflecting surface of the mirror. The fixed state corresponds to a design position of the mirror with respect to the casing. The mirror adjusting mechanism is fixed upon attaching the mirror to the casing, without effecting an adjustment of the mirror adjusting mechanism. The design position is within a range of angular adjustment corresponding to the adjustable state of the mirror adjusting mechanism.

In a preferred embodiment, the view finder is a real image type of view finder in which an object image formed by an objective optical system is viewed through an ocular optical system.

The mirror is provided between the objective optical system and the ocular optical system.

The adjusting apparatus further comprises a glass field frame and a mirror securing member to which the mirror is secured. The glass field frame which is located optically behind the mirror, so that the object image can be formed on the glass field frame.

Preferably, the mirror adjusting mechanism comprises a convex cylindrical surface which is provided on the mirror securing member and which is perpendicular to a plane including an optical axis of light incident upon the mirror and an optical axis of light reflected off the mirror, the convex cylindrical surface having a center of curvature located on the adjusting axis, a recessed cylindrical surface provided on the casing and corresponding to the convex cylindrical surface, and a means for biasing the convex cylindrical surface against the recessed cylindrical surface.

In a preferred embodiment, the mirror adjusting mechanism includes a rotation restricting member which restricts rotation of the mirror to hold the same at the design position when the convex cylindrical surface is engaged with the recessed cylindrical surface.

According to another aspect of the present invention, an adjusting apparatus of a mirror having a reflecting surface located in an optical path of a view finder is provided, comprising a convex cylindrical surface provided on a securing member to which the mirror is secured, the convex cylindrical surface being perpendicular to a plane including an optical axis of light incident upon the mirror and an optical axis of light reflected off the mirror, the convex cylindrical surface having a center of curvature located on a center axis on the mirror surface, a recessed cylindrical surface provided on a supporting member of the mirror corresponding to the convex cylindrical surface, a rotation restricting member which restricts the rotation of the mirror to hold the same at a predetermined optimal position when the convex cylindrical surface engages with the recessed cylindrical surface, and a rotation and adjustment permitting means for releasing the rotation restricting member to permit the rotation and adjustment of the mirror when the convex cylindrical surface is engaged with the recessed cylindrical surface.

It is preferable that a hole is provided on the cylindrical surface of the supporting member, and that guide grooves are provided on the rear surface of the supporting member opposite the recessed cylindrical surface, the guide grooves being parallel with central axes of the convex cylindrical surface and the recessed cylindrical surface and located on opposite sides of a bisector of an angle defined by the optical axis of the light incident upon the mirror and the optical axis of the light reflected off the mirror.

Mirror adjustment can be effected by moving the rotation restricting member against the force of a biasing mechanism, which biases the rotation restricting member and the securing member towards each other and into contact with the supporting member, rotating the rotation restricting member ninety degrees, and releasing the same so that the rotation restricting member can be rotated in contact with the cylindrical surface of the supporting member.

With this arrangement, the mirror in the viewfinder is set at a position which is most likely to result in a coincident field of view and picture plane. Upon looking through the viewfinder to determine correspondence between the field of view and picture plane, it is unlikely that the manufacturer will need to make an adjustment. However, if it is necessary to make an adjustment, the present invention allows for such adjustment to be made easily.

The present disclosure relates to subject matter contained in Japanese patent application No. 4-172345 (filed on Jun. 30, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 4:
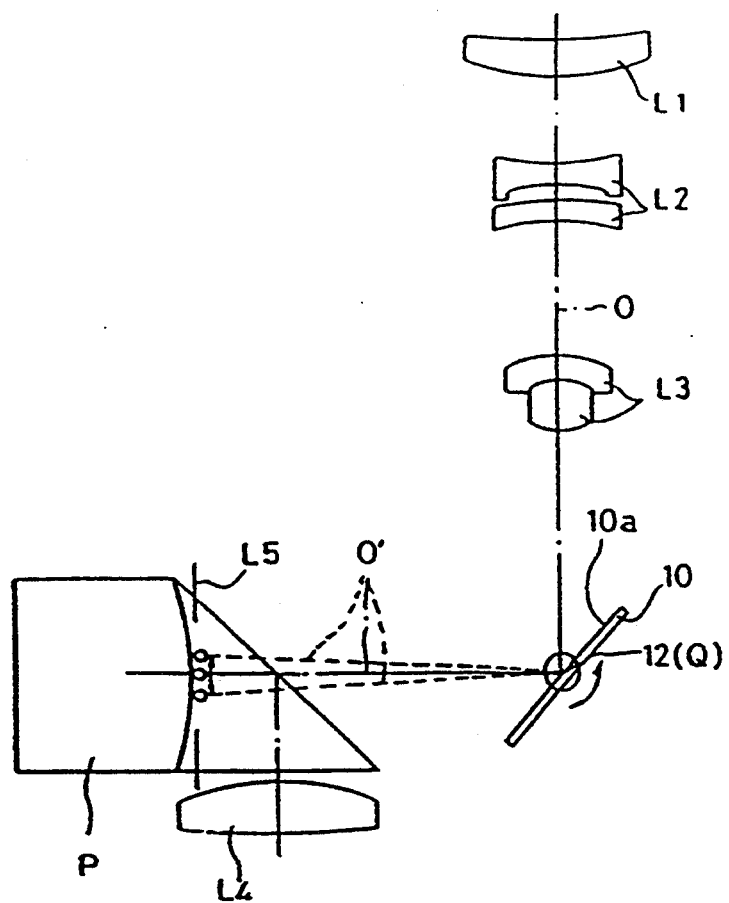
FIG. 4 is a plan view of an optical system of a visual field adjuster of a view finder according to the present invention; and, FIG. 5 is a perspective view of a visual field adjuster of a view finder shown in FIG. 4.
Figure 5:
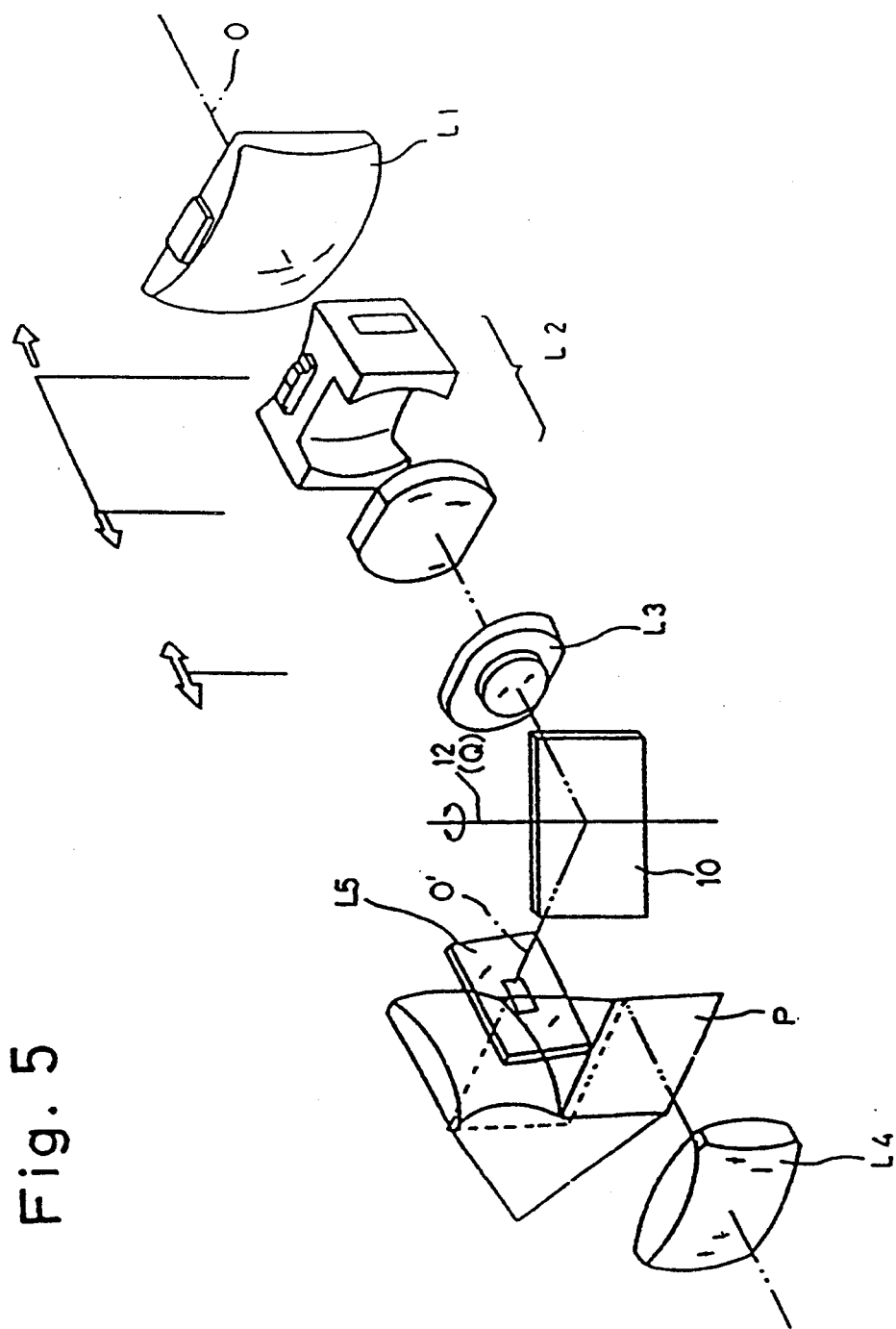

FIGS. 4 and 5 show an example of a real image type of zoom finder optical system to which the present invention is applied. The finder optical system includes a first lens assembly L1, a second lens assembly L2, a third lens assembly L3, a mirror 10, a glass field frame L5, a compound lens prism P, and a fourth lens assembly L4, arranged in this order from the objective side. The first, second and third lens assemblies, L1 through L3, constitute an objective optical system which forms an object image on the glass field frame L5. The compound lens prism P and the fourth lens assembly L4 constitute an ocular optical system through which an inverted image on the field frame L5 can be observed. The mirror 10 and three reflecting surfaces of the compound lens prism P constitute an image erecting optical system which erects the inverted image formed by the objective optical system.

The mirror 10 is provided with a reflecting surface 10a which reflects the optical path at an angle of 90° in a horizontal plane. When the mirror 10 is rotated in the directions indicated by arrows shown in FIGS. 4 and 5 about an adjusting axis 12 perpendicular to a plane (i.e., horizontal plane) including an optical axis O of light incident upon a reflection point Q of the reflecting surface 10a and an optical axis O' of outgoing light (i.e., reflected light), the direction of the optical axis O' of the reflected light is varied in the horizontal plane, as shown by imaginary lines in FIG. 4. Consequently, parallax can be adjusted in the horizontal direction by oscillating the visual field of the finder in the right and left directions in the horizontal plane.

Figure 1:
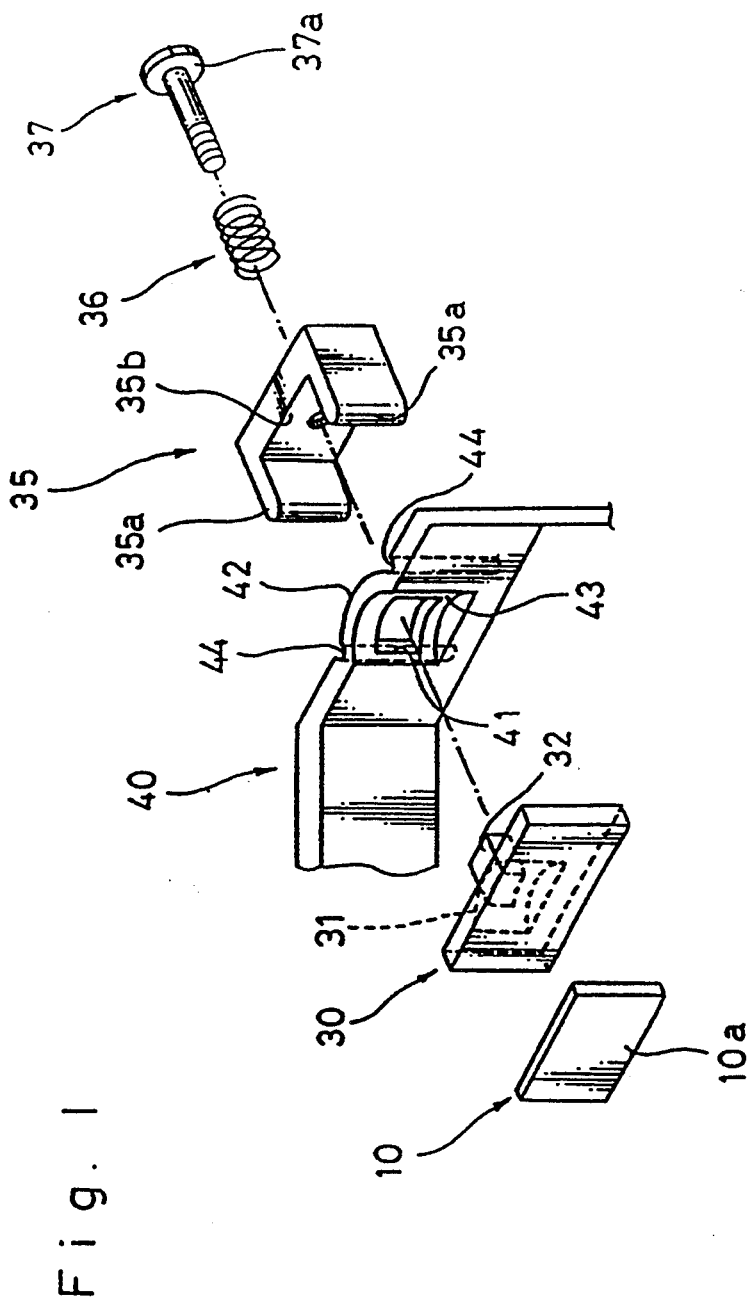
FIG. 1 is an exploded perspective view of main parts of the visual field adjuster of a view finder according to an embodiment of the present invention.
Figure 2:
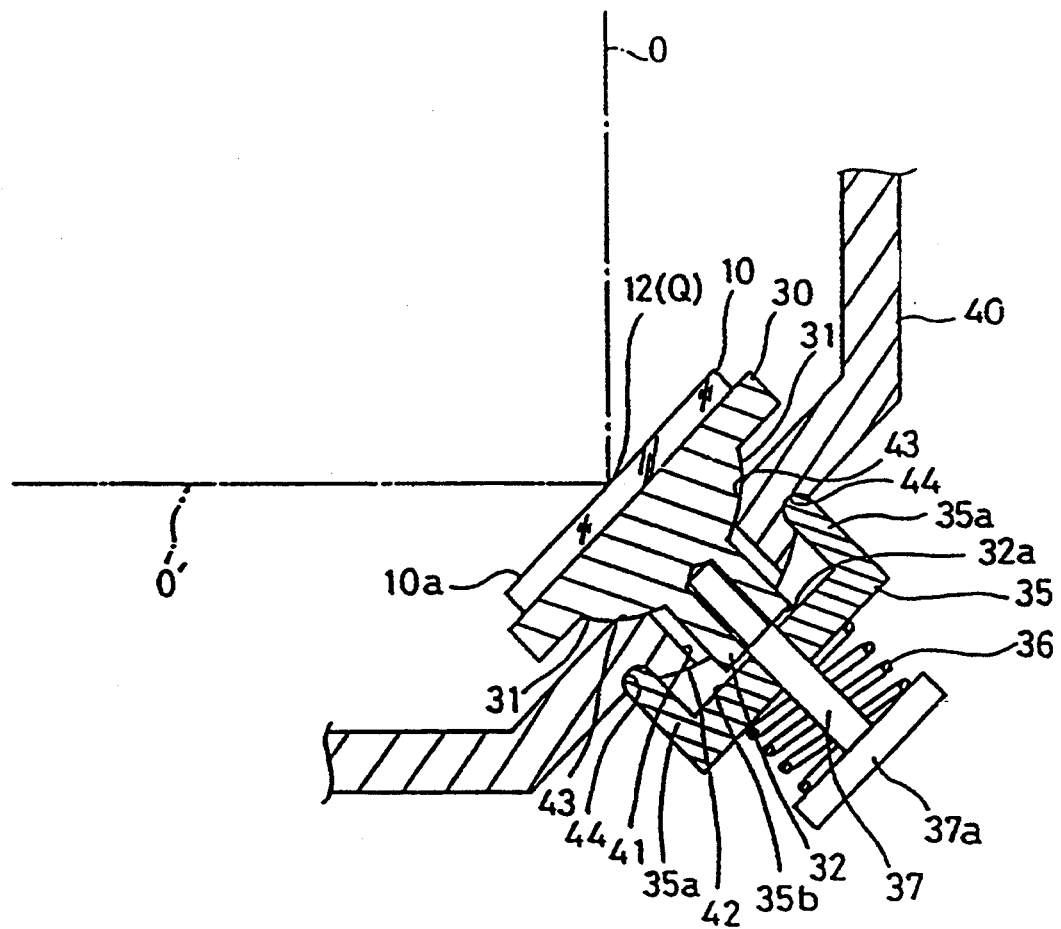
FIG. 2 is a sectional view of a visual field adjuster of a view finder shown in FIG. 1.
Figure 3:
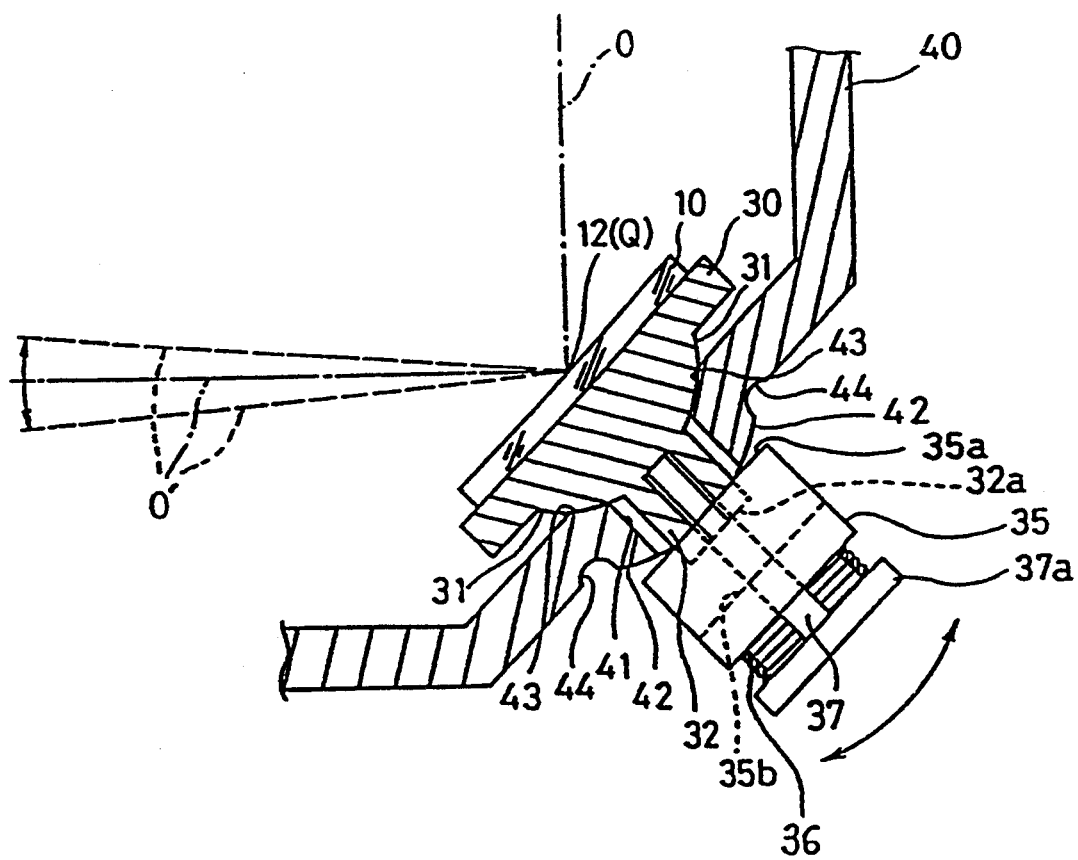
FIG. 3 is a sectional view of a visual field adjuster of a view finder shown in a position different from FIG. 2.

The subject of the present invention is mainly directed to a mirror adjusting mechanism which allows for adjustment of the mirror 10 about the adjusting axis 12. FIGS. 1 through 3 show an embodiment thereof.

A mirror securing member 30 to which the mirror 10 is secured is provided on a back surface thereof with a convex cylindrical surface portion 31 having a center of curvature which is located on the adjusting axis 12, and a post 32 is integrally connected to a center of the convex cylindrical surface portion 31.

A casing 40 which holds the mirror 10 is provided with a recessed cylindrical surface portion 43 defined by a part of a cylinder whose center of curvature is located on the adjusting axis 12, so that the convex cylindrical surface portion 31 of the mirror securing member 30 can be snugly received in the recessed cylindrical surface portion 43 of the casing 40. Namely, the radius of curvature of the convex cylindrical surface portion 31 is substantially identical to that of the recessed cylindrical surface portion 43.

The post 32 of the mirror securing member 30 extends through a hole 41 formed in the wall of the recessed cylindrical surface portion 43. There is a predetermined clearance between the hole 41 and the post 32 to permit the mirror securing member 30 to rotate. A screw or bolt 37 is screwed in an end 32a of the post 32 through a rotation restricting member 35 and a compression spring 36. The rotation restricting member 35 is rotatable and slidable in the axial direction thereof with respect to the screw 37. The compression spring 36 is compressed between the rotation restricting member 35 and head 37a of the screw 37. Consequently, the rotation restricting member 35 is continuously biased towards the casing 40 by the compression spring 36.

The casing 40 is provided, on the back side thereof, opposite to the recessed cylindrical surface portion 43, with a convex cylindrical surface portion 42 having a center of curvature which is located on the adjusting axis 12, and a pair of guide grooves 44 parallel to the adjusting axis 12 on opposite sides of the convex cylindrical surface portion 42. The guide grooves 44 are located on opposite sides of a bisector of an angle defined by the optical axis O of light incident upon the reflection point Q of the reflecting surface 10a and the optical axis O' of the outgoing light (i.e., reflected light) which is reflected at the reflection point Q. Ends of a pair of projections 35a of the rotation restricting member 35 are fitted in the guide grooves 44. In FIG. 2, the end 32a of the post 32 is spaced from an inner surface 35b of the rotation restricting member 35.

In the arrangement described above, the casing 40 is firmly held by and between the mirror securing member 30 and the rotation restricting member 35 by the force of the compression spring 36, so that the convex cylindrical surface portion 31 of the mirror securing member 30 can be brought into close contact with the recessed cylindrical surface portion 43 of the casing 40. Consequently, the mirror 10 can only rotate about the adjusting axis 12. Furthermore, in the position shown in FIG. 2 in which the ends of the projections 35a of the rotation restricting member 35 are fitted in the guide grooves 44, rotation of the mirror 10 about the adjusting axis 12 is also restricted. Consequently, in the assembled state shown in FIG. 2, the stable position is always maintained. The stable position (i.e., fixed state) corresponds to a reference position (i.e., design position) of the mirror 10 which is the most appropriate position for making the finder visual field coincident with the actual picture plane. Namely, on the assumption that a resultant dimensional error of other components, caused upon assembly or manufacturing thereof, is within a certain range, the finder visual field will concur with the actual picture plane of a film.

The components which determine the reference position of the mirror 10, including the mirror securing member 30, the recessed cylindrical surface portion 43 of the casing 40, the guide grooves 44 and the rotation restricting member 35, etc., are precisely manufactured. It is necessary to check whether or not the finder visual field concurs with the actual picture plane of a film in the assembled position shown in FIG. 2. If the finder visual field and the actual film picture plane concur, no adjustment of the mirror 10 is necessary. In other words, adjustment of the field of view is not necessary every time the mirror is assembled, as with the finders in the prior art.

If it is determined that adjustment is necessary, the mirror 10 is rotated about the adjusting axis 12 to adjust the visual field. In this adjustment operation, the rotation restricting member 35 is held, for example, by an operator, and moved away from the casing 40 against the compression spring 36. As a result, the ends of the projections 35a of the rotation restricting member 35 are disengaged from the guide grooves 44. Thereafter, the rotation restricting member 35 is rotated by 90° about the axis of the screw 37, as shown in FIG. 3. In this state, projections 35a abut against the convex cylindrical surface portion 42, while a certain clearance exists between the hole 41 and the post 32. Consequently, the ends of the projections 35a of the rotation restricting member 35 and the convex cylindrical surface portion 31 are slid within the clearance with respect to the convex cylindrical surface portion 42 and the recessed cylindrical surface portion 43, respectively, by the movement of the rotation restricting member 35 in the directions indicated by the arrows in FIG. 3, so that the mirror 10 can be rotated about the adjusting axis 12. Thus, the necessary adjustment can be effected by the rotation of the mirror 10 about the adjusting axis 12. Upon completion of the adjustment, mirror the securing member 30, or the rotation restricting member 35 is secured to the casing 40, for example, by an adhesive.

Although the illustrated embodiment is applied to a real image type of zoom finder, the present invention is not limited thereto. Namely, the present invention can be generically applied to a view finder having a mirror.

As can be understood from the above discussion, according to the present invention, adjustment of the field of view of the finder is necessary only when the position of the mirror, after the assembly thereof, is incorrect due to a manufacturing error, etc. Accordingly, the assembling operation is simplified.

I claim:

1. An adjusting apparatus of a mirror having a reflecting surface located in an optical path of a view finder, comprising:
   a convex cylindrical surface provided on a securing member to which the mirror is secured, said convex cylindrical surface being perpendicular to a plane including an optical axis of light incident upon the mirror and an optical axis of light reflected off the mirror, said convex cylindrical surface having a center of curvature located on a center axis of the mirror surface;
   a recessed cylindrical surface provided on a supporting member of the mirror corresponding to said convex cylindrical surface;
   a rotation restricting member which restricts the rotation of the mirror to hold the mirror at a reference design position most likely to make a visual field coincident with a field frame, when said convex cylindrical surface engages with said recessed cylindrical surface;
   rotation and adjustment permitting means for releasing the rotation restricting member to permit the rotation and adjustment of the mirror while maintaining engagement of said convex cylindrical surface with said recessed cylindrical surface; and
   means for preventing rotation of the mirror with respect to an adjusting axis once an adjusted position for the mirror has been set by said mirror adjusting means, said rotation preventing means being independent of said rotation restricting member;
   wherein a hole is provided on said cylindrical surface of said supporting member, and wherein guide grooves are provided on a rear surface of said supporting member opposite the recessed cylindrical surface, said guide grooves being parallel with central axes of said convex cylindrical surface and said recessed cylindrical surface and located on opposite sides of a bisector of an angle defined by the optical axis of the light incident upon the mirror and the optical axis of the light reflected off the mirror.

2. An adjusting apparatus according to claim 1, wherein said securing member is provided with a post which extends through said hole at the center portion of said convex cylindrical surface, and wherein projections are provided on said rotation restricting member and fitted in said guide grooves of the supporting plate.

3. An adjusting apparatus according to claim 2, further comprising biasing means for biasing said rotation restricting member and said securing member towards each other and into contact with said supporting member.

4. An adjusting apparatus according to claim 3, wherein said rotation and adjustment permitting means comprises means for separating the projections of said rotation restricting member from the associated guide grooves.

5. An adjusting apparatus according to claim 4, wherein the adjustment of the mirror can be effected after said rotation restricting member is moved against said biasing means to disengage the projections from the associated guide grooves.

6. An adjusting apparatus according to claim 1, wherein said convex cylindrical surface and said recessed cylindrical surface substantially prevent rotation of the mirror an axis other than the adjusting axis.

7. An adjusting apparatus according to claim 1, wherein said rotation preventing means comprises an adhesive.

8. An adjusting apparatus of a mirror having a reflecting surface located in an optical path of a view finder, comprising:
   a convex cylindrical surface provided on a securing member to which the mirror is secured, said convex cylindrical surface being perpendicular to a plane including an optical axis of light incident upon the mirror and an optical axis of light reflected off the mirror, said convex cylindrical surface having a center of curvature located on a center axis of the mirror surface;
   a recessed cylindrical surface provided on a supporting member of the mirror corresponding to said convex cylindrical surface;
   a rotation restricting member which restricts the rotation of the mirror to hold the mirror at a predetermined optimal position when said convex cylindrical surface engages with said recessed cylindrical surface; and,
   rotation and adjustment permitting means for releasing the rotation restricting member to permit the rotation and adjustment of the mirror while maintaining engagement of said convex cylindrical surface with said recessed cylindrical surface;
   wherein a hole is provided on said recessed cylindrical surface, and wherein guide grooves are provided on a rear surface of said supporting member opposite said recessed cylindrical surface, said guide grooves being parallel with central axes of said convex cylindrical surface and said recessed cylindrical surface and located on opposite sides of a bisector of an angle defined by the optical axis of the light incident upon the mirror and the optical axis of the light reflected off the mirror.

9. An adjusting apparatus according to claim 8, wherein said securing member is provided with a post which extends through said hole at the center portion of said convex cylindrical surface, and wherein projections are provided on said rotation restricting member and fitted in said guide grooves of said supporting member.

10. An adjusting apparatus according to claim 9, further comprising means for biasing said rotation restricting member and said security member towards each other and into contact with said supporting member.

11. An adjusting apparatus according to claim 10, wherein said rotation and adjustment permitting means comprises means for separating the projections of said rotation restricting member from the associated guide grooves.

12. An adjusting apparatus according to claim 11, wherein the adjustment of the mirror can be effected after said rotation restriction member is moved against said biasing means to disengage the projections from the associated guide grooves.

13. An adjusting apparatus according to claim 8, wherein said convex cylindrical surface and said recessed cylindrical surface substantially prevent rotation of the mirror about all but one axis.

14. An adjusting apparatus according to claim 8, further comprising:
means for initially setting the mirror, prior to adjustment, in a position most likely to result in a coincident field of view and picture plane.

* * * * *